United States Patent
Kuo

(10) Patent No.: US 10,498,592 B2
(45) Date of Patent: Dec. 3, 2019

(54) METHOD AND BASEBOARD MANAGEMENT CONTROL SYSTEM FOR AUTOMATICALLY PROVIDING ERROR STATUS DATA

(71) Applicant: MITAC COMPUTING TECHNOLOGY CORPORATION, Taoyuan (TW)

(72) Inventor: Ming-I Kuo, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 277 days.

(21) Appl. No.: 15/437,755

(22) Filed: Feb. 21, 2017

(65) Prior Publication Data

US 2017/0331675 A1    Nov. 16, 2017

(30) Foreign Application Priority Data

May 11, 2016    (TW) .............................. 105114515 A

(51) Int. Cl.
*G06F 15/173*    (2006.01)
*H04L 12/24*    (2006.01)
*G06F 11/30*    (2006.01)
*H04L 12/26*    (2006.01)

(52) U.S. Cl.
CPC ............ *H04L 41/069* (2013.01); *G06F 11/30* (2013.01); *H04L 41/0631* (2013.01); *H04L 43/04* (2013.01); *H04L 43/06* (2013.01); *H04L 43/0823* (2013.01)

(58) Field of Classification Search
CPC ... H04L 41/0631; H04L 41/069; H04L 43/04; H04L 43/06; H04L 43/0823; G06F 11/30
USPC ................................ 709/217, 219, 223, 224
See application file for complete search history.

(56) References Cited

U.S. PATENT DOCUMENTS

| | | | |
|---|---|---|---|
| 6,170,067 B1* | 1/2001 | Liu ........................... | G06F 1/26 714/31 |
| 8,661,306 B2* | 2/2014 | Zhang ................... | G06F 11/006 714/748 |
| 2005/0081114 A1* | 4/2005 | Ackaret ................ | G06F 11/076 714/42 |
| 2008/0125984 A1* | 5/2008 | Skendzic ........... | G05B 23/0267 702/59 |

(Continued)

FOREIGN PATENT DOCUMENTS

TW    201505400 A    2/2015
TW    201516665 A    5/2015

*Primary Examiner* — Liang Che A Wang
*Assistant Examiner* — Johnny B Aguiar
(74) *Attorney, Agent, or Firm* — Brinks Gilson & Lione

(57) ABSTRACT

A method for automatically providing error status data is to be performed by a baseboard management control system of a computer device, and includes steps of: A) accessing error status data that is recorded in a central processing unit of the computer device and that is related to data of at least one error status of the computer device, B) determining whether the error status data corresponds to at least one of a plurality of specific types of error statuses associated with the computer device, and C) transmitting the error status data to a management terminal via a network when it is determined that the error status data corresponds to at least one of the plurality of specific types of error statuses.

10 Claims, 2 Drawing Sheets

(56) References Cited

U.S. PATENT DOCUMENTS

| | | | |
|---|---|---|---|
| 2009/0144699 A1* | 6/2009 | Fendt | G06F 11/004 |
| | | | 717/120 |
| 2010/0313072 A1* | 12/2010 | Suffern | G06F 11/0793 |
| | | | 714/37 |
| 2014/0115386 A1* | 4/2014 | Huang | G06F 11/0709 |
| | | | 714/15 |
| 2016/0006620 A1* | 1/2016 | Maity | H04L 41/22 |
| | | | 715/733 |
| 2016/0179635 A1* | 6/2016 | Kondalsamy | G06F 11/203 |
| | | | 714/4.12 |
| 2016/0261455 A1* | 9/2016 | Su | H04L 41/069 |
| 2017/0111215 A1* | 4/2017 | Chou | H04L 41/0618 |

* cited by examiner

METHOD AND BASEBOARD MANAGEMENT CONTROL SYSTEM FOR AUTOMATICALLY PROVIDING ERROR STATUS DATA

CROSS-REFERENCE TO RELATED APPLICATION

This application claims priority of Taiwanese Application No. 105114515, filed on May 11, 2016.

FIELD

The disclosure relates to a baseboard management control system and a method, and more particularly to a method tor automatically providing error status data and a baseboard management control system for performing the same.

BACKGROUND

A conventional computer device serving as a server usually includes a baseboard management control system. The baseboard management control system is utilized to provide error status data related to at least an error status of the computer device for facilitating management of the computer device by an administrator.

A management terminal is often used by the administrator to transmit a request to the baseboard management control system for acquiring the error status data stored in the baseboard management control system. The baseboard management control system passively responds to the request from the management terminal by transmitting the error status data to the management terminal. When duration between two successive requests requesting the error status data by the management terminal is longer, it is harder for the administrator to monitor the error status data of the computer device in real time, so the computer device might not be repaired timely if an error occurs therein.

SUMMARY

Therefore, an object of the disclosure is to provide a method and a baseboard management control system that can alleviate at least one of the drawbacks of the prior art.

According to one aspect of the disclosure, the method for automatically providing error status data is to be performed by a baseboard management control system that is included in a computer device and that is communicably connected to a management terminal via a network. The computer device further includes a central processor unit (CPU) electrically connected to the baseboard management control system. The method includes steps of: A) accessing error status data that is recorded in the CPU and that is related to data of at least one error status of the computer device, B) determining whether the error status data corresponds to at least one of a plurality of specific error statuses associated with the computer device, and C) transmitting the error status data to the management terminal via the network when it is determined that the error status data corresponds to at least one of the plurality of specific error statuses.

According to another aspect of this disclosure, the baseboard management control system for automatically providing error status data is to be included in a to a management terminal via a network. The computer device further includes a CPU electrically connected to the baseboard management control system. The baseboard management control system includes a processing module and a communication module. The processing module is electrically connected to the CPU. The processing module is configured to access error status data that is recorded in the CPU and that is related to data of at least one error status of the computer device, and to determine whether the error status data corresponds to at least one of a plurality of specific error statuses associated with the computer device. The communication module is electrically connected to the processing module, and is configured to transmit the error status data to the management terminal via the network when it is determined that the error status data corresponds to at least one of the plurality of specific error statuses.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
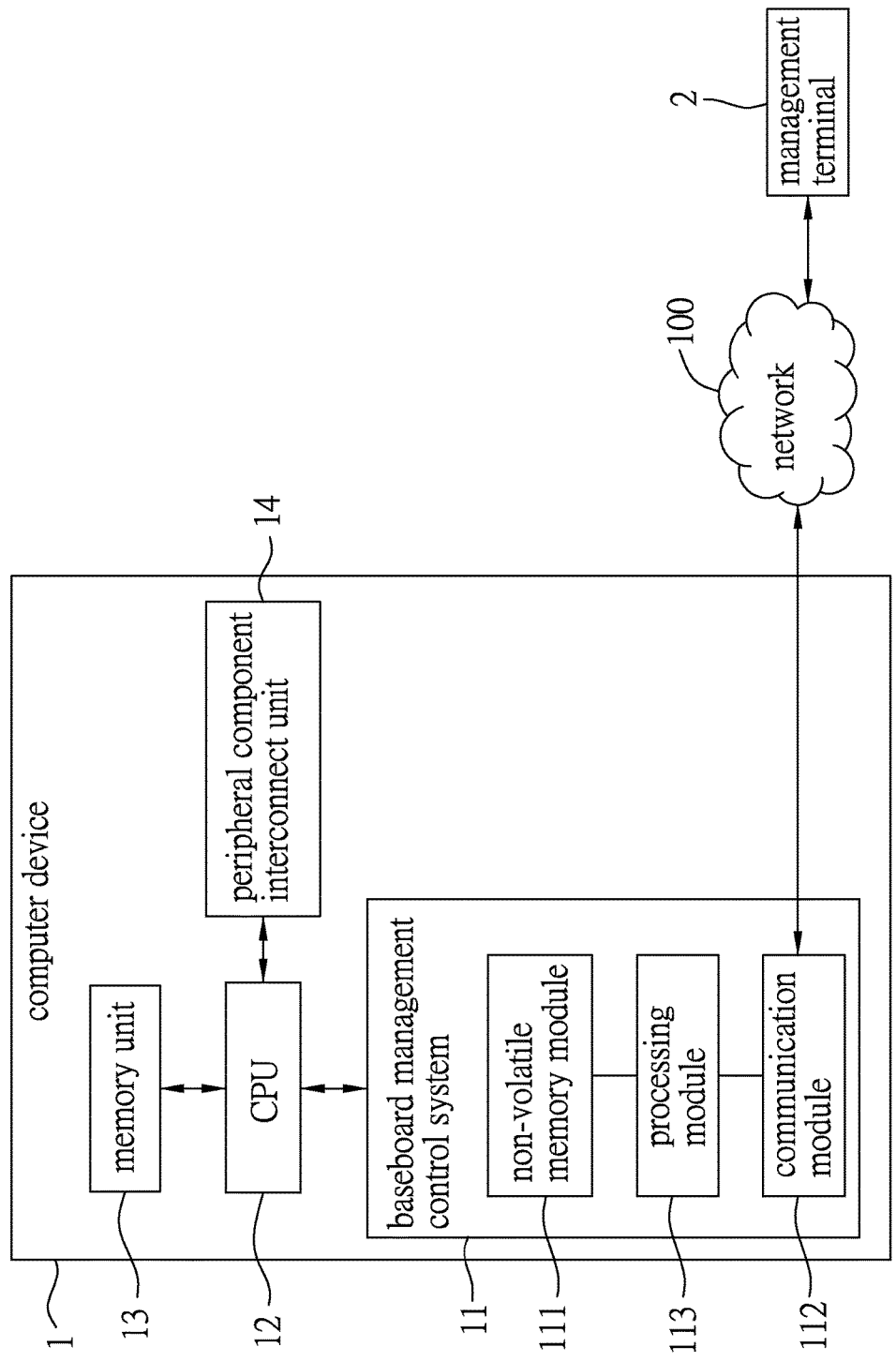
FIG. 1 is a block diagram illustrating an embodiment of a baseboard management control system included in a computer device according to the disclosure.

Before the disclosure is described in greater detail, it should be noted that where considered appropriate, reference numerals or terminal portions of reference numerals have been repeated among the FIGS. to indicate corresponding or analogous elements, which may optionally have similar characteristics.

Referring to FIG. 1, an embodiment of a baseboard management control system 11 according to this disclosure is described below. The baseboard management control system 11 is communicably connected to a management terminal 2 via a network 100. A computer device 1 includes a central processor unit (CPU) 12, a memory unit 13 electrically connected to the CPU 12, a peripheral component interconnect (PCI) unit 14 electrically connected to the CPU 12, and the baseboard management control system 11 electrically connected to the CPU 12. The baseboard management control system 11 includes a processing module 113, a non-volatile memory module 111 electrically connected to the processing module 113, and a communication module 112 electrically connected to the processing module 113. The communication module 112 is connected to the network 100. In this embodiment, the computer device 1 is exemplified as a server, the CPU 12 is exemplified as a CPU manufactured by Intel Corporation, and the management terminal 2 is exemplified as a system log server.

The processing module 113 of the baseboard management control system 11 is configured to access, through a platform environmental control interface (PECI), error status data that is recorded in a register (not shown) of the CPU 12 and that is related to data of at least one error status of the computer device 1. The processing module 113 is further configured to determine whether the error status data corresponds to at least one of a plurality of specific error statuses associated with the computer device 1. The error status data includes machine check architecture error status data. The specific error statuses belong to different error types, and include at least one of an abnormal status of the CPU 12, an error of the memory unit 13, and an error of the PCI unit 14.

The baseboard management control system 11 is configured to store the error status data only when it is determined that the error status data corresponds to at least one of the plurality of specific error statuses. Specifically, the processing module 113 is further configured to compress the error status data thus accessed to generate a compressed file containing the error status data when it is determined that the error status data corresponds to at least one of the plurality of specific error statuses, and store the compressed file and transmit the compressed file to the management terminal 2 via the network 100.

In another embodiment, the processing module 113 is further configured to generate access time data that records current time while accessing the error status data. The processing module 113 is further configured to transmit, to the management terminal 2, predetermined identification data and the access time data when it is determined that the error status data corresponds to at least one of the plurality of specific error statuses. The predetermined identification data is related to the baseboard management control system 11, and the access time data indicates a time point at which the error status data is accessed. The processing module 113 is configured to compress the error status data, the identification data and the access time data to generate a compressed file when it is determined that the error status data corresponds to at least one of the plurality of specific error statuses. The compressed file contains the error status data, the identification data and the access time information. The processing module 113 is configured to store the compressed file and to transmit the compressed file to the management terminal 2 via the network 100.

In another embodiment, the processing module 113 is further configured to count down a preset time period when it is determined that the error status data does not correspond to at least one of the plurality of specific error statuses.

Figure 2:
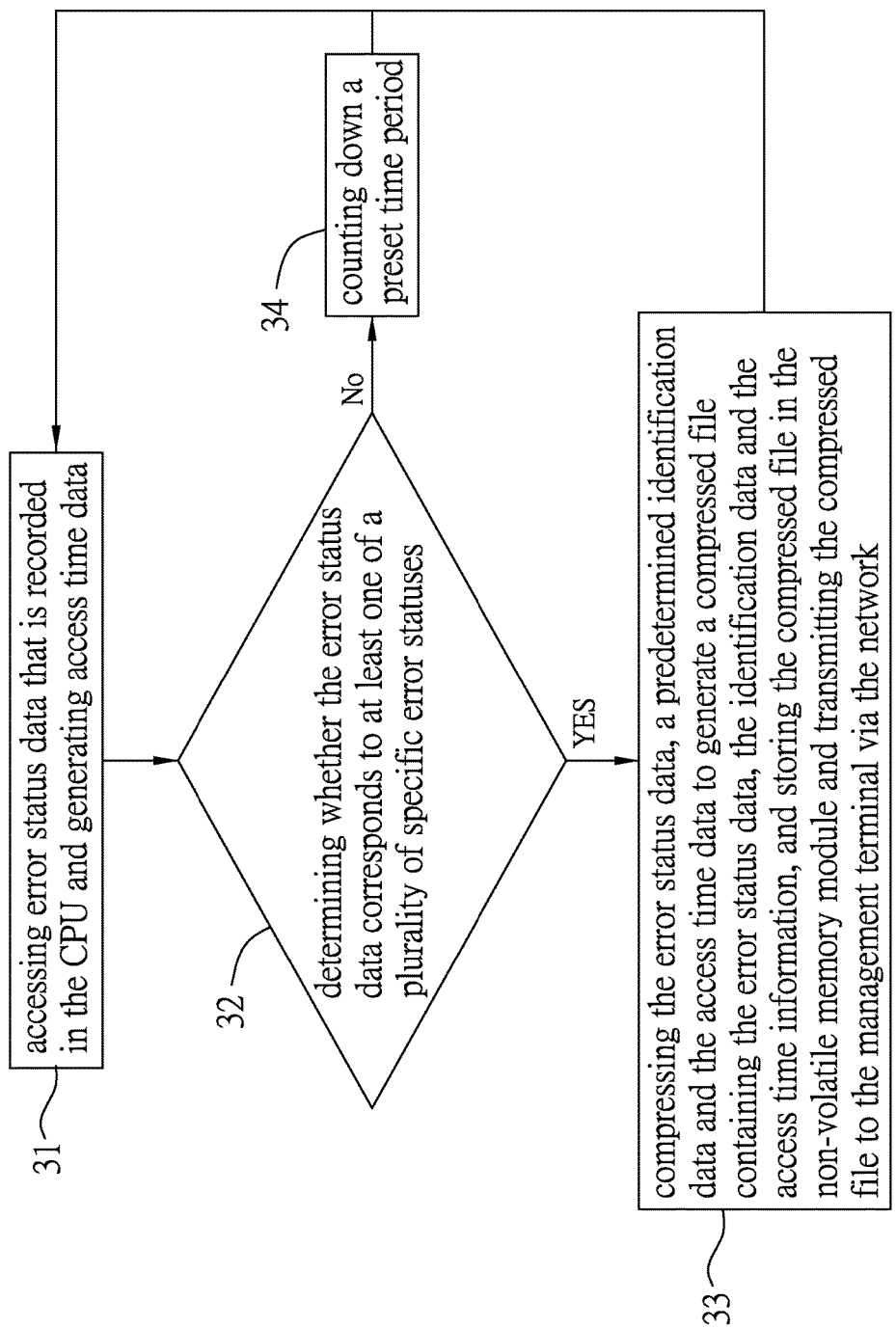
FIG. 2 is a flowchart illustrating an embodiment of a method for automatically providing error status data according to this disclosure.

Referring to FIG. 2, an embodiment of a method for automatically providing error status data according to this disclosure is described below. The method is to be performed by a baseboard management control system 11 that is included in a computer device 1 and that is communicably connected to a management terminal 2 via a network 100 as exemplarily shown in FIG. 1.

In step 31 of FIG. 2, a processing module 113 of the baseboard management control system 11 accesses, through the PECI, error status data that is recorded in the register of a CPU 12 of the computer device 1 and that is related to data of at least one error status of the computer device 1. The processing module 113 further generates access time data that records current time while accessing the error status data in step 31. In step 32, the processing module 113 of the baseboard management control system 11 determines whether the error status data corresponds to at least one of a plurality of specific error statuses. In the affirmative, the flow proceeds to step 33. In the negative, the flow goes to step 34. In step 33, the processing module 113 of the baseboard management control system 11 compresses the error status data, a predetermined identification data and the access time data to generate a compressed file containing the error status data, the identification data and the access time information, stores the compressed file in a non-volatile memory module 111 of the baseboard management control system 11, and transmits the compressed file to the management terminal 2 via the network 100. Herein, the identification data is related to the baseboard management control system 11. In this embodiment, the processing module 113 of the baseboard management compressed file stored in the non-volatile memory module 111 with a current one of the compressed file that is just compressed for storage of the current one of the compressed file therein. After the current one of the compressed file is transmitted to the management terminal 2, the flow goes back to step 31. In step 34, the processing module 113 of the baseboard management control system 11 counts down a preset time period, for example, 3 seconds, and the flow goes back to step 31 after the present time period elapses. By repeating the flow of the method according to the disclosure, the administrator may be timely informed of the error status data of the computer device 1, so appropriate measures may be taken to recover the computer device 1 from an error state.

In one variation of this embodiment, step 34 (i.e., counting down a preset time period) may be omitted. Thus, the flow directly goes back to step 31 when it is determined by the processing module 113 in step 32 that the error status data does not correspond to any of the plurality of specific error statuses.

In another variation of this embodiment, step 34 may be further performed after step 33. In this configuration, when it is determined by the processing module 113 in step 32 that the error status data corresponds to at least one of the plurality of specific error statuses, steps 33 and 34 are performed in sequence and then the flow goes back to step 31.

It is noted that the management terminal 2 can be used to receive a plurality of error status data respectively corresponding to a plurality of computer devices from respective baseboard management control systems installed in the respective computer devices. Each compressed file not only includes the error status data, but also the identification data. Thus, the administrator may be informed of the correspondence between the error status data and the baseboard management control system installed in a corresponding one of the computer devices. Besides, each compressed file further contains the access time data indicating a time point at which the error status data is accessed, and the time point is close to a time point when the corresponding error is reported by the CPU 12 in the computer device 1. However, in another embodiment according to this disclosure, the processing module 113 of the baseboard management control system 11 may transmit the compressed file that only contains the error status data to the management terminal 2, and information contained in the compressed file is not limited to the disclosure herein.

To sum up, in the method for automatically providing error status data according to this disclosure, the baseboard management control system 11 determines whether the error status data thus accessed corresponds to at least one of a plurality of specific error statuses, and transmits the compressed file containing the error status data to the management terminal 2 via the network 100 when it is determined that the error status data corresponds to at least one of the plurality of specific error statuses. In this way, the administrator may be alleviated from the burden of periodically operating the management terminal 2 to send requests for the error status data stored in the baseboard management control system 11. Besides, when the baseboard management control system 11 more frequently determines whether the error status data corresponds to at least one of the plurality of specific error statuses, the management terminal 2 is able to receive the error status data corresponding to the specific error status in a more timely manner. Thus, the administrator can repair the computer device 1 in time.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for automatically providing error status data, the method to be performed by a baseboard management control system which is included in a computer device and is communicably connected to a management terminal via a network, the computer device further including a central processor unit (CPU) electrically connected to the baseboard management control system, the method comprising steps of:
    A) accessing the error status data recorded in the CPU, and generating access time data recording a time point at which the error status data is accessed not a time point at which an error occurs, wherein the error status data includes machine check architecture error status data, and is related to data of at least one error status of the computer device;
    B) determining whether the error status data corresponds to at least one of a plurality of specific types of error statuses associated with the computer device, wherein the plurality of specific types of error statuses include at least one of an abnormal status of the CPU, an error of a memory unit included in the computer device, and an error of a peripheral component interconnect unit included in the computer device; and
    C) transmitting an entirety of the error status data accessed in step A), predetermined identification data related to the baseboard management control system, and the access time data indicating a time point at which the error status data is accessed to the management terminal via the network when the error status data is determined to be corresponding to the at least one of the plurality of specific types of error statuses, and counting down a preset time period when the error status data is determined to be not corresponding to the at least one of the plurality of specific types of error statuses, and a flow of the method goes back to step A) after the preset time period has elapsed.

2. The method as claimed in claim 1, wherein step C) includes sub-steps of:
    compressing the error status data thus accessed to generate a compressed file containing the error status data when the error status data is determined to be corresponding to the at least one of the plurality of specific types of error statuses; and
    transmitting the compressed file to the management terminal via the network.

3. The method as claimed in claim 1, further comprising step (D) storing, by the baseboard management control system, the error status data when the error status data is determined to be corresponding to the at least one of the plurality of specific types of error statuses.

4. The method as claimed in claim 3, wherein step D) includes sub-steps of:
    compressing the error status data thus accessed to generate a compressed file containing the error status data when the error status data is determined to be corresponding to the at least one of the plurality of specific types of error statuses; and
    storing the compressed file.

5. The method as claimed in claim 1, wherein step C) includes sub-steps of:
    compressing the error status data, the identification data and the access time data to generate a compressed file containing the error status data, the identification data and the access time data when the error status data is determined to be corresponding to the at least one of the plurality of specific types of error statuses; and
    transmitting the compressed file to the management terminal via the network.

6. The method as claimed in claim 5, further comprising the step of storing the compressed file.

7. A baseboard management control system for automatically providing error status data, the baseboard management control system to be included in a computer device, and to be communicably connected to a management terminal via a network, the computer device further including a central processing unit (CPU) electrically connected to the baseboard management control system, the baseboard management control system comprising:
    a processing module electrically connected to the CPU, and configured to
        access the error status data recorded in the CPU, wherein the error status data includes machine check architecture error status data, and is related to data of at least one error status of the computer device,
        generate access time data recording a time point at which the error status data is accessed not a time point at which an error occurs,
        determine whether the error status data corresponds to at least one of a plurality of specific types of error statuses associated with the computer device, wherein the plurality of specific types of error statuses include at least one of an abnormal status of the CPU, an error of a memory unit included in the computer device, and an error of a peripheral component interconnect unit included in the computer device, and
        count down a preset time period when the error status data is determined to be not corresponding to the at least one of the plurality of specific types of error statuses; and
    a communication module electrically connected to said processing module, and configured to transmit an entirety of the error status data corresponding to the access time data, predetermined identification data related to the baseboard management control system, and the access time data indicating a time point at which the error status data is accessed to the management terminal via the network when the error status data is determined to be corresponding to the at least one of the plurality of specific types of error statuses.

8. The baseboard management control system as claimed in claim 7, wherein the baseboard management control system is configured to store the error status data when the error status data is determined to be corresponding to the at least one of the plurality of specific types of error statuses.

9. The baseboard management control system as claimed in claim 8, wherein said processing module is further configured to
compress the error status data thus accessed to generate a compressed file containing the error status data when the error status data is determined to be corresponding to the at least one of the plurality of specific types of error statuses,
store the compressed file, and
transmit the compressed file to the management terminal via the network for transmission of the error status data to the management terminal.

10. The baseboard management control system as claimed in claim 7, wherein said processing module is configured to
compress the error status data, the identification data and the access time data to generate a compressed file containing the error status data, the identification data and the access time data when the error status data is determined to be corresponding to the at least one of the plurality of specific types of error statuses,
store the compressed file, and
transmit the compressed file to the management terminal via the network for transmission of the error status data to the management terminal.

\* \* \* \* \*